(12) United States Patent
Dias et al.

(10) Patent No.: US 10,862,765 B2
(45) Date of Patent: Dec. 8, 2020

(54) ALLOCATION OF SHARED COMPUTING RESOURCES USING A CLASSIFIER CHAIN

(71) Applicant: EMC IP Holding Company LLC, Hopkinton, MA (US)

(72) Inventors: Jonas F. Dias, Rio de Janeiro (BR); Adriana Bechara Prado, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 143 days.

(21) Appl. No.: 16/049,986

(22) Filed: Jul. 31, 2018

(65) Prior Publication Data
US 2020/0044938 A1 Feb. 6, 2020

(51) Int. Cl.
*H04L 12/24* (2006.01)
*H04L 29/08* (2006.01)
*G06N 20/00* (2019.01)

(52) U.S. Cl.
CPC ........... *H04L 41/145* (2013.01); *G06N 20/00* (2019.01); *H04L 41/16* (2013.01); *H04L 41/5019* (2013.01); *H04L 67/10* (2013.01)

(58) Field of Classification Search
USPC ......................................................... 709/226
See application file for complete search history.

(56) References Cited

U.S. PATENT DOCUMENTS

| 2009/0180430 A1* | 7/2009 | Fadell | H04L 47/10 370/329 |
| 2012/0330711 A1* | 12/2012 | Jain | G06Q 30/04 705/7.23 |
| 2014/0379619 A1* | 12/2014 | Permeh | G06N 5/02 706/12 |
| 2016/0217390 A1* | 7/2016 | Shoaib | G06N 20/00 |
| 2018/0157743 A1* | 6/2018 | Hori | G06N 3/08 |

OTHER PUBLICATIONS

Read et al. "Classifier Chains for Multi-label Classification" 2011 (Year: 2011).*
Read et al. "classifier chain for multi-label classification" 2011 (Year: 2011).*

(Continued)

*Primary Examiner* — Hermon Asres
(74) *Attorney, Agent, or Firm* — Ryan, Mason & Lewis, LLP (57) ABSTRACT

Techniques are provided for allocation of shared computing resources using a classifier chain. An exemplary method comprises obtaining an application for execution in a shared computing environment having multiple resources with multiple combinations of one or more hardware types; obtaining discriminative features for the application; obtaining a trained machine learning classifier chain, wherein the trained machine learning classifier chain comprises multiple classifiers, wherein the multiple classifiers comprise a classifier for each combination of hardware types; and generating, using the at least one trained machine learning classifier chain, a prediction of the combination of hardware types needed to satisfy one or more service level agreement requirements for the application to be executed in the shared computing environment.

20 Claims, 7 Drawing Sheets

(56) References Cited

OTHER PUBLICATIONS

Eduardo Goncalves, "Novel Classifier chains methods for multi-label classification based on genetic algorithms", Universidade Federal Fluminense, Chapter 4, pp. 37-60, PhD thesis, 2015.
Read et al., "Classifier chains for multi-label classification", Machine Learning, 2011.
Quinlan, J.R., "Induction of Decision Trees, Machine Learning", 1986.

* cited by examiner

ALLOCATION OF SHARED COMPUTING RESOURCES USING A CLASSIFIER CHAIN

FIELD

The field relates generally to resource allocation techniques for a shared computing environment.

BACKGROUND

Recently, shared computing techniques (such as cloud computing techniques) have become a prominent model for business computation. Among other benefits of shared computing, companies, as well as end users, only pay for their usage, without a substantial initial investment, by scaling shared computing resources according to their needs.

Virtualization is an important technology behind shared computing. Infrastructure providers rely on virtualization to support their business models, as virtualization enables an abstraction of the available resources as virtual components. To efficiently manage these resources, infrastructure providers need efficient scheduling algorithms and good resource allocation policies. Furthermore, infrastructure providers often need to guarantee service level agreements (SLAs) entered with their customers.

Infrastructure providers, however, also need to minimize their management costs as much as possible. Thus, infrastructure providers do not want to be overly conservative in their resource allocation policies to avoid larger costs. Allocating more resources than the needs of a given customer will likely result in increased costs, which might lead to reduced profits or competitiveness. On the other hand, allocating less resources than needed might lead to SLA violations, which may also lead to penalties and financial loss.

A need therefore exists for improved techniques for allocation of shared computing resources.

SUMMARY

In one embodiment, a method comprises obtaining an application for execution in a shared computing environment having a plurality of resources with a plurality of combinations of one or more hardware types; obtaining a plurality of discriminative features for the application; obtaining at least one trained machine learning classifier chain, wherein the at least one trained machine learning classifier chain comprises a plurality of classifiers, wherein the plurality of classifiers comprises a classifier for each combination of hardware types; and generating, using the at least one trained machine learning classifier chain, a prediction of the combination of hardware types needed to satisfy one or more SLA requirements for the application to be executed in the shared computing environment.

In some embodiments, the at least one trained machine learning classifier chain is trained using a set of discriminative features obtained for a plurality of executed applications, a corresponding combination of hardware types allocated to each executed application and a corresponding measurement of one or more metrics of the service level agreement requirements obtained for each executed application.

In one or more embodiments, the generating step determines a classification for each of the classifiers in the plurality of classifiers in the classifier chain using the set of discriminative features obtained for the application and the combination of hardware types assigned by each of zero or more prior classifiers in the plurality of classifiers in the chain.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for allocation of shared computing resources using a classifier chain.

Data intensive applications, such as Image Processing and Deep Learning applications, are driving the need for richer datacenters. Companies build their private clouds equipped with heterogeneous hardware with particular data processing capabilities and performance. One or more embodiments of the disclosure provide improved techniques for allocating resources, such as compute resources, to applications in a heterogeneous environment.

In one or more embodiments, a machine learning technique is provided to support heterogeneous resource allocation in a datacenter, based on the needs of each application. Each application may need different types of compute resources, for example, to be efficiently executed. Deep learning applications, for example, are known to be efficiently executed in the presence of accelerators. One or more aspects of the present disclosure recognize that the problem of learning how to best allocate resources to an application can be regarded as a multi-label classification problem, where an instance may be associated with multiple labels. In the present context, an instance is a particular user's application, while the labels are related to the particular types of hardware resources (e.g., central processing unit (CPU), graphics processing unit (GPU) or disk), to be allocated to a particular application, to satisfy the SLA requirements.

There are often correlations between labels (e.g., the type of chosen accelerator may be correlated with the chosen type of CPU, as they are often put together within the same device). Thus, in one or more embodiments, a classifier chain is used for the resource allocation problem. See, for example, Jesse Read et al., "Classifier Chains for Multi-Label Classification," Machine Learning, 2011, incorporated by reference herein.

Generally, a classifier chain is a particular type of machine learning model, where classifiers are linked in a chain structure. Each of the linked classifiers pass their predictions to the other classifiers in the chain. The classifier chain model can be applied to predict a substantially best configuration of resources to be allocated to a given application, satisfying SLA constraints.

The allocation of computing resources to an application in a heterogeneous environment, while satisfying SLA constraints, can pose a number of challenges. For example, if an application has not been executed before, it is hard to know how the application impacts the system load. The application program may be CPU bound or I/O (input/output) bound, for example, and may also load a lot of data in memory. Thus, there is a need for the service providers to rely on characteristics of past executions of similar applications in order to discover the substantially best configuration of resources to be allocated.

Log data from datacenters are typically a rich source of information. In order to learn from past executions, there is a need to leverage characteristics of applications that have already been run in the datacenter, the types of resources that were allocated to the applications, and the values of different SLA metrics, such as the execution times. In this manner, it is possible to train machine learning models that will predict the substantially best set of resources to be allocated, given the characteristics of the application and the values of the SLA metrics to be achieved.

Compute resources, for example, are computing machines comprised of a set of devices (CPU, memory, GPU, etc.). There may be resources that are never placed together or resources that are always placed together in the same device. Given this, a dependency among different resources should be taken into account, in some embodiments.

As noted above, one or more embodiments of the disclosure employ a classifier chain to identify an allocation of resources for a given application in a datacenter. Machine learning tasks are often distinguished into two categories, namely, predictive tasks and descriptive tasks. Given an input dataset, predictive tasks use the values of one or more available attributes of the input dataset to predict unknown or future values of a specific attribute (which is often called the target). Based on the input dataset, a model is learned for the target attribute as a function of the other attributes. Generally, the goal is often to learn a model with a low prediction error (e.g., where the error between the predicted value and the true value of the target attribute is minimized). Classification and regression are two examples of predictive tasks.

For a classification task, a model is built to predict one discrete attribute (usually referred to as a class label or a label), based on the values of the other attributes. An example of a classification model is a decision tree. See, for example, J. R. Quinlan, "Induction of Decision Trees, Machine Learning," 1986, incorporated by reference herein.

A classifier chain is a machine learning method for the task of multi-label classification, in which a label set (two or more labels) is predicted for a given object. For example, a song may be associated with multiple genres (e.g., pop and jazz genres).

One or more aspects of the disclosure recognize that a classifier chain, in comparison to other multi-classification methods, can model label correlations. Generally, the classifier chain passes label information between classifiers in the chain.

Figure 1:
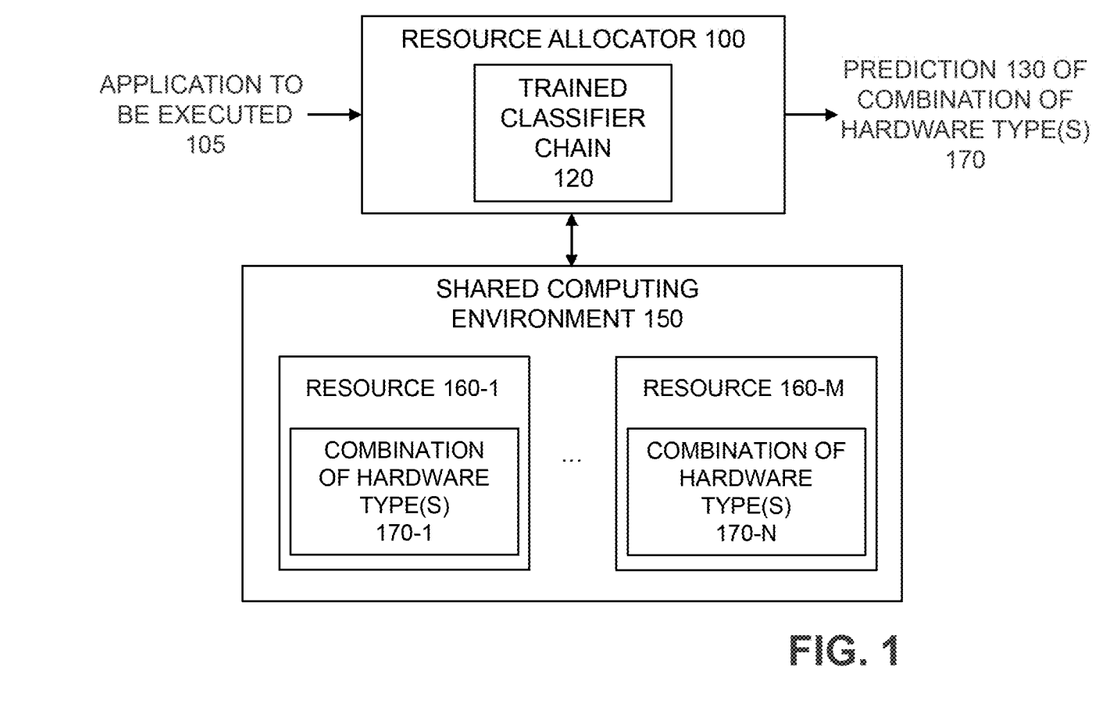
FIG. 1 illustrates an exemplary resource allocator, according to an embodiment of the disclosure.

FIG. 1 illustrates an exemplary resource allocator 100, according to an embodiment of the disclosure. Generally, the resource allocator 100 employs a trained classifier chain 120 to identify an allocation of resources for a given application to be executed in a shared computing environment 150. As shown in FIG. 1, the exemplary shared computing environment 150 comprises a plurality of resources 160-1 through 160-M. Each resource 160 has a particular combination of hardware types 170-1 through 170-N, such as a CPU, a GPU and/or disk. For example, in some embodiments, one or more of the resources 160 can be implemented as a compute node, such as a server.

As shown in FIG. 1, for a given application to be executed 105, the exemplary resource allocator 100 generates a prediction 130 of a combination of hardware type(s) 170 in the shared computing environment 150 to be used to execute the given application 105. It is noted that the predicted combination of hardware type(s) 170 can be found on one or more different resource nodes 160 in the shared computing environment 150, as discussed further below in conjunction with FIG. 3.

Figure 2:
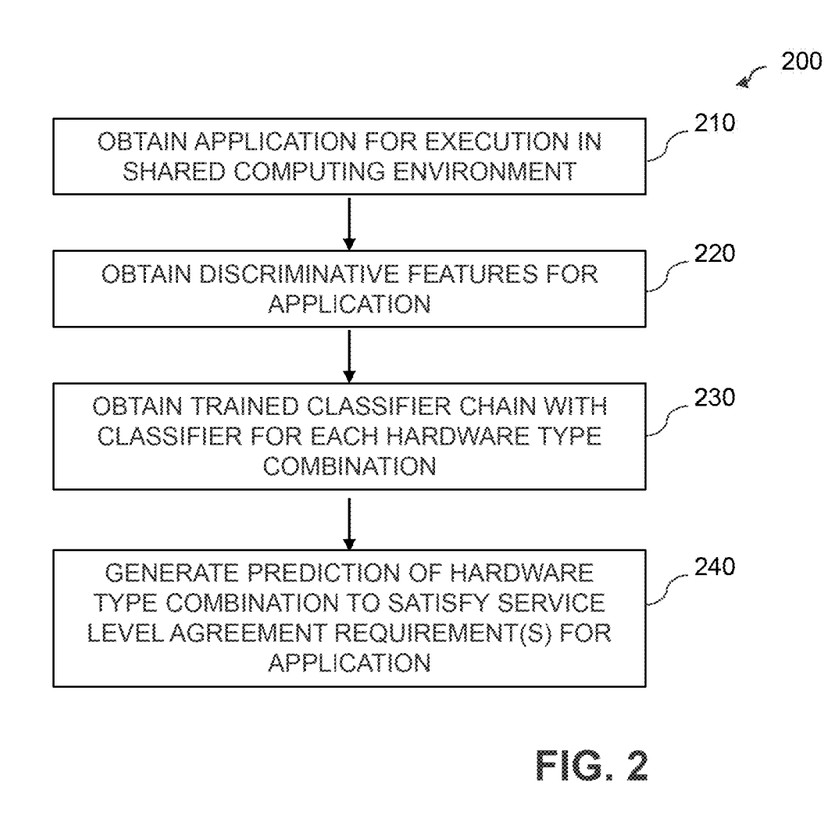
FIG. 2 is a flow chart illustrating an exemplary implementation of a classifier chain-based resource allocation process, according to one embodiment of the disclosure.

FIG. 2 is a flow chart illustrating an exemplary implementation of a classifier chain-based resource allocation process 200, according to one embodiment of the disclosure. As shown in FIG. 2, the exemplary classifier chain-based resource allocation process 200 initially obtains an application for execution in the shared computing environment 150 during step 210. As noted above, the shared computing environment 150 has multiple resources 160 with multiple combinations 170 of one or more hardware types.

During step 220, the classifier chain-based resource allocation process 200 obtains discriminative features for the application (for example, by extracting the discriminative features from the source code of the application, as discussed below). The classifier chain-based resource allocation process 200 then obtains a trained classifier chain 120 during step 230 having a classifier for each hardware type combination 170. As noted above, the trained classifier chain 120 comprises multiple classifiers.

Finally, during step 240, the exemplary classifier chain-based resource allocation process 200 generates prediction of the hardware type combination 170 needed to satisfy one or more SLA requirements for the application to be executed in the shared computing environment 150. In some embodiments, the prediction is generated by each of the classifiers in the plurality of classifiers in the classifier chain 120 using the set of discriminative features obtained for the application 105 and the combination of hardware types 170 assigned by each of the prior classifiers in the classifier chain 120.

Generally, the classifier chain is generated as a user-defined classifier chain comprising k labels $\{l_1 \rightarrow l_2 \rightarrow \ldots \rightarrow l_k\}$. The training of the classifier chain comprises learning k binary classifiers, one for each label $l_i$, following a chain ordering. The first binary classifier, $y_1$, is trained using only the attribute set X (also referred to as feature set) as its input attributes. This classifier, $y_1$, is responsible for the prediction of the first label in the chain ($l_1$). The second binary classifier, $y_2$, is trained having as input a different feature set: the attribute set X augmented with the training information of the first label in the chain ($l_1$). This classifier, $y_2$, is responsible for the prediction of the second label in the chain ($l_2$). Each subsequent classifier $y_j$ is trained using the attribute set X augmented with the training information of j−1 labels as its input attributes. In other words, the feature set of each classifier $y_j$ is extended with the true label information of all previous labels in the chain.

Figure 3:
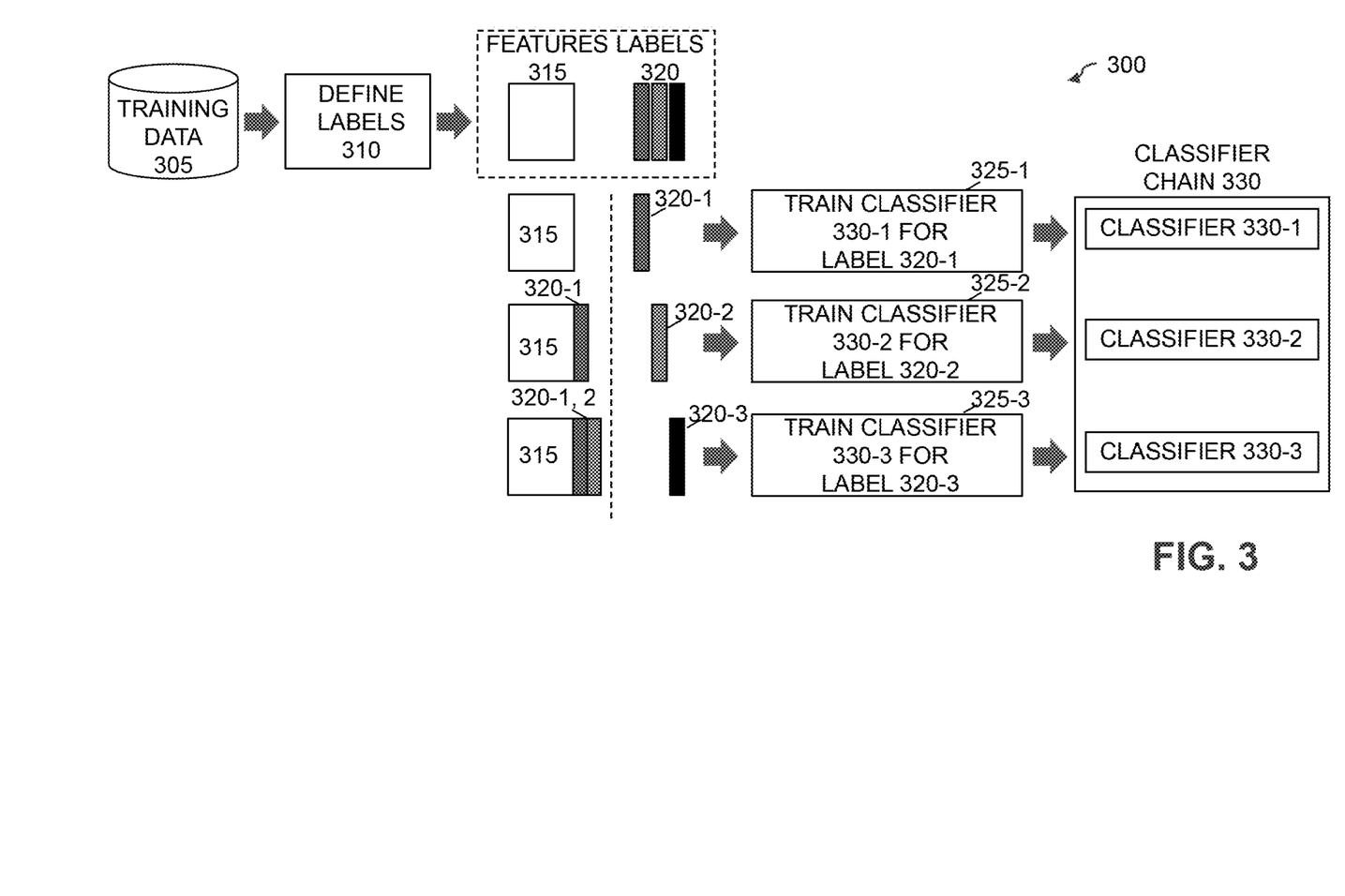
FIG. 3 illustrates an exemplary implementation of a training process for a classifier chain, according to one embodiment.

FIG. 3 illustrates an exemplary implementation of a training process 300 for a classifier chain 330, according to one embodiment of the disclosure. Generally, the exemplary classifier chain 330 comprises a plurality of classifiers 330-1 through 330-3 (e.g., k=3 in the embodiment of FIG. 3). The classifier chain 330 is trained using training data 305, comprising a set of discriminative features 315 obtained for a plurality of previously executed applications, a corresponding combination of hardware types allocated to each executed previously application (e.g., the particular one or more hardware types allocated to each previously executed application) and a corresponding measurement of one or more metrics of SLA requirements obtained for each previously executed application.

In some embodiments, the set of discriminative features 315 in the training data 305 is extracted from source code for each previously executed application. For a detailed discussion of suitable techniques for extracting the discriminative features 315 from source code for each previously executed application, see, for example, U.S. patent application Ser. No. 15/941,434, filed Mar. 30, 2018, entitled "Allocation of Shared Computing Resources Using Source Code Feature Extraction and Machine Learning," incorporated by reference herein in its entirety.

As shown in FIG. 3, labels 320 for each combination 170 of one or more hardware types in the training data 305 are defined during step 310. The discriminative features 315 and the labels 320 are used during the training, as follows. As noted above, each of the classifiers 330-i in classifier chain 330 is trained using the discriminative features 315 obtained for the plurality of executed applications and the label 320-j for the combination 170 of hardware types assigned by each of the prior (zero or more) classifiers 330-i in the classifier chain 330.

Thus, as shown in FIG. 3, classifier 330-1 is trained for label 320-1 using the discriminative features 315 during step 325-1. Likewise, classifier 330-2 is trained for label 320-2 during step 325-2 using the discriminative features 315 and the label 320-1 for the corresponding combination 170 of hardware types. Finally, classifier 330-3 is trained for label 320-3 during step 325-3 using the discriminative features 315 and the labels 320-1 and 320-2 for the corresponding combinations 170 of hardware types.

In one exemplary embodiment, each instance of the training and test sets will represent an application, comprised of: (i) attributes X={$x_1, x_2, \ldots x_n$}, which may be related to some characteristics of the application in question (such characteristics may be features extracted from the source code of a given application, as noted above); (ii) values of the corresponding collected SLA metrics S={$s_1, s_2, \ldots s_m$}; and (iii) the k compute resources that were allocated to the application, R={$r_1, r_2, \ldots r_k$}. R is regarded as the set of labels associated to the application in question.

For a more detailed discussion of techniques for building a classifier chain machine learning model, see, for example, Eduardo Gonçalves, "Novel Classifier Chains Methods for Multi-Label Classification based on Genetic Algorithms," Universidade Federal Fluminense, PhD Thesis, 2015, incorporated by reference herein.

Figure 4:
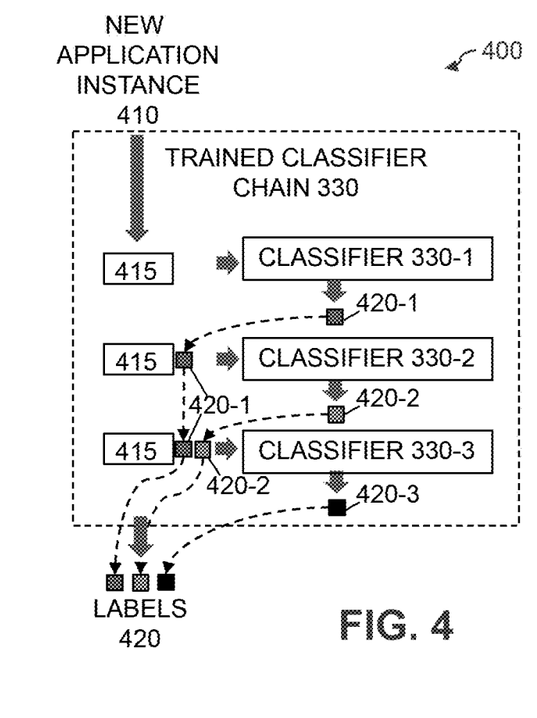
FIG. 4 illustrates an exemplary implementation of a prediction process that uses the trained classifier chain of FIG. 3 to generate a prediction of the combination of hardware types needed to satisfy one or more SLA requirements for an application, according to an embodiment.

FIG. 4 illustrates an exemplary implementation of a prediction process 400 that generates a prediction of the combination 170 of hardware types needed to satisfy one or more SLA requirements for the application 105 to be executed in the shared computing environment 150, according to an embodiment. Generally, the exemplary prediction process 400 uses the trained classifier chain 330 of FIG. 3 to classify a new application instance 410 by predicting the combination 170 of hardware types needed to satisfy one or more SLA requirements for the application instance 410 to be executed in the shared computing environment 150.

Thus, given the need to execute a new application instance 410 (such as a general-purpose computer-based application), the exemplary prediction process 400 allocates the appropriate computing resources in the shared computing environment 150 (such as a datacenter) using the classifier chain 330, taking into consideration the constraints of the available infrastructure. For example, the allocated resources should be capable of executing the application, avoiding SLA infringement.

As shown in FIG. 4, the discriminative features 415 of the application instance 410 are obtained from the application instance 410, for example, by extracting the discriminative features 415 from the source code of the application instance 410, as noted above. The first classifier 330-1 in the classifier chain 330 generates a prediction of the combination of hardware types for label 420-1 using the discriminative features 415. Likewise, classifier 330-2 generates a prediction of the combination of hardware types for label 420-2 using the discriminative features 415 and the prediction for label 420-1. Finally, classifier 330-3 generates a prediction of the combination of hardware types for label 420-3 using the discriminative features 415 and the predictions for labels 420-1 and 420-2.

Thus, once the classifier chain 330 is trained using the training process 300, the classification performed by the prediction process 400 is also performed in a chained way. To predict the set of labels of a new instance, k classifications are necessary. The process begins at classifier $y_1$ and goes along the classifier chain. In this way, the classifier $y_j$ predicts the relevance of label $l_j$, given the features of the new instance augmented by the predictions performed by the previous j−1 classifiers.

In some embodiments, the classifier chain 330 predicts the combination 170 of needed hardware types (e.g., the prediction may indicate, for example, that the CPU should be implemented as an Intel Xeon 8180 processor; that the GPU should be implemented as an NVIDIA P100 processor; and that the disk should be implemented using a solid-state disk). While the generated prediction identifies the combination 170 of needed hardware types for the application instance 410, in some embodiments, the generated prediction does not identify the particular resource node 160 (e.g., a particular resource/server). Since the training data 305 is based on the actual set of resources 160 of the shared computing environment 150 (such as a datacenter), there will be at least one server (or other resource 160) with the required specification reported by the classifier chain 330.

One or more aspects of the disclosure recognize that computer-based applications, such as application instance 410, may need different combinations 170 of compute resources (e.g., hardware types) to be effectively executed. For example, current deep learning applications can take advantage of hardware accelerators to run efficiently. Meanwhile, other applications may take advantage of faster disk access. Given this, in the present disclosure, the problem of learning the substantially best resource configuration to execute the application instance 410 in a heterogeneous shared computing environment 150 (such as a datacenter) is regarded as a multi-label classification problem, where an instance (e.g., application 410) may be associated with multiple labels (e.g., a label set). Here, the labels are related to particular types of CPU, hardware accelerators, disks, and other hardware types, that can be allocated to the application 410, so as to satisfy the SLA requirement.

It is again noted that correlations between labels are very likely to exist. For example, the chosen type of GPU may be strongly correlated with the chosen type of CPU, as they are very often put together within the same device, in a given datacenter.

In some embodiments, the exemplary shared computing environment 150 (such as a datacenter) collects and stores historical data as the training dataset 305. For each application executed in the past, the training dataset 305 stores its characteristics, the corresponding allocated compute resources, as well as measurements of the obtained SLA metrics. The collected data will then be used as the training and test sets, that is, the dataset from which a classifier chain 330 is to be trained and tested, respectively.

Figure 5:
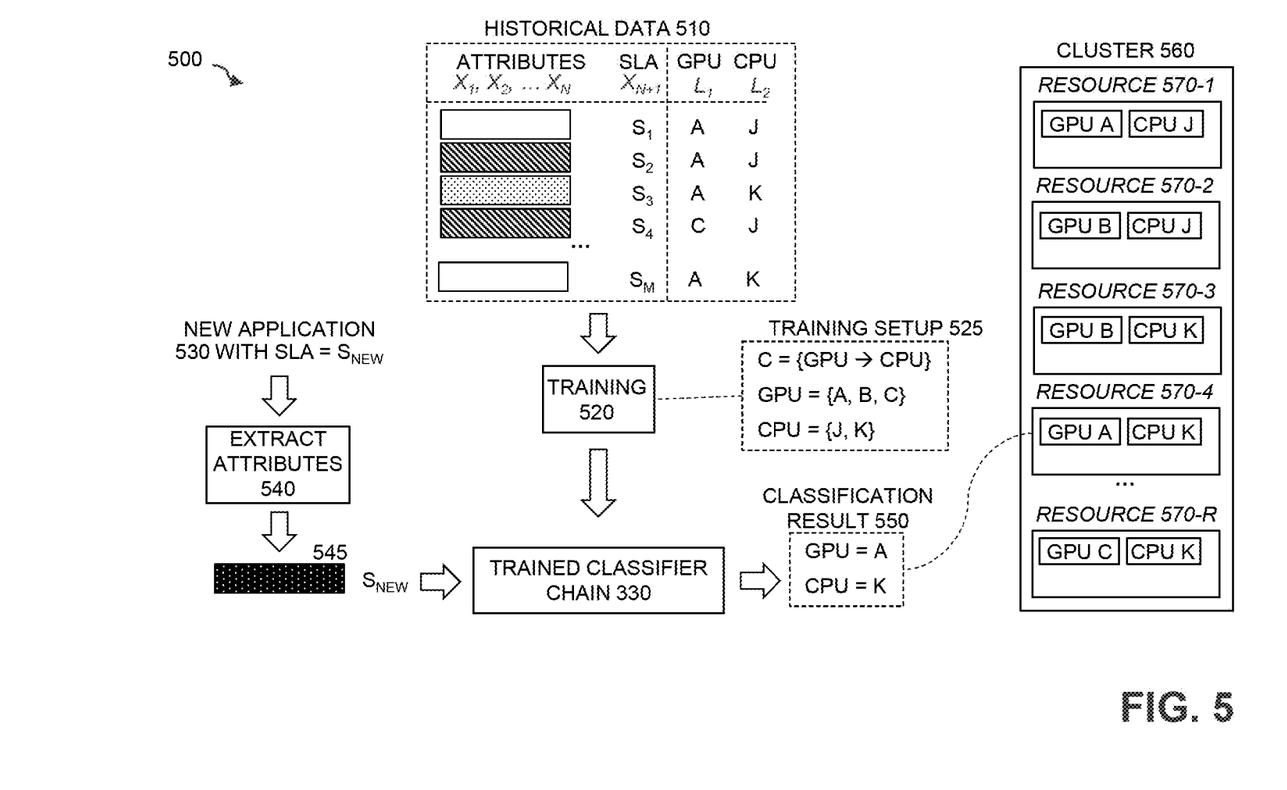
FIG. 5 illustrates an exemplary implementation of a training and prediction process that trains the classifier chain and generates a resource allocation prediction, according to some embodiments.

FIG. 5 illustrates an exemplary implementation of a training and prediction process 500 that trains the classifier chain and generates a prediction of the combination 170 of hardware types needed to satisfy one or more SLA requirements for the application 105 to be executed in the shared computing environment 150, according to an embodiment. Generally, the exemplary training and prediction process 500 first trains the classifier chain 330 and then uses the trained classifier chain 330 to classify a new application instance 530 by predicting the combination 170 of hardware types needed to satisfy one or more SLA requirements for the application instance 530 to be executed in the shared computing environment 150.

In the example of FIG. 5, the exemplary shared computing environment 150 comprises a cluster 560 with resources 570-1 through 570-R. Each resource 570 has a particular GPU type and a particular CPU type. Assume that there are three different models (types) of GPUs (A, B and C) as well as two different models (types) of CPUs (J and K). The resources 570 in the cluster 560 have different combinations of those GPU and CPU types.

As shown in FIG. 5, historical data 510 contains a registry of all applications executed in this cluster 560, comprising (i) extracted attributes $X=\{x_1, x_2, \ldots x_n\}$ of each application, which may be related to some characteristics of the application in question; (ii) values of the corresponding collected SLA metrics $S_i=\{S_1, S_2, \ldots S_M\}$ (e.g. time to complete the application); and (iii) the respective resource that were allocated to the application ($l_1$ and $l_2$).

The exemplary historical data 510 is used to train the classifier chain during step 520 to produce the trained classifier chain 330. The training setup 525 indicates that the classifier order in the classifier chain 330 (C) is that the GPU label is processed, followed by the CPU label. As noted above, there are three different models (types) of GPUs (A, B and C) as well as two different models (types) of CPUs (J and K) in the training setup 525.

When a new application 530 arrives, having a required SLA $S_{New}$, attributes 545 (e.g., $x_1, x_2, \ldots x_n$) of the new application 530 are extracted during step 540. The extracted attributes 545 and SLA $S_{New}$ are applied as inputs for the trained classifier chain 330. The trained classifier chain 330 will predict the labels ($l_1$ and $l_2$) to run application 530 that satisfy the required SLA. In the example of FIG. 5, the trained classifier chain 330 predicts that the GPU should be implemented using type A and that the CPU should be implemented using type K. Thus, a possible resource to run the application with the predicted combination 170 of hardware types is resource 570-4.

Submission of processing workloads to a cluster of compute resources is common in many industries. Nowadays, with the growing popularity of machine learning applications, more companies are building compute clusters to process applications from their customers or internal users. As hardware evolves, the infrastructure available for those clusters becomes more heterogeneous. If the resources are not properly managed, an imbalance between the use of newer and older hardware typically occurs. Furthermore, it is hard to know if a given compute device will be capable of processing a given application under the SLA requirements.

In one exemplary implementation of the disclosure, consider a service provider with a production cluster that has grown over time. The production cluster has gone through six upgrades over the last five years. Several devices have also undergone maintenance. Thus, the devices have had some parts replaced with newer models. Consequently, the compute resources of the cluster have different configurations. There are currently four different generations of CPUs, seven different generations of GPUs and two types of disk storage (slow and fast). Many combinations of those parts occur in the cluster.

When an application is submitted to be processed, the cluster decides the substantially most appropriate resources to allocate for the job. Since there are many possibilities in terms of CPU, GPU and disk, it might be hard to decide the best one. However, the disclosed trained machine learning classifier chain, given the characteristics of the application and the SLA requirements, can indicate the appropriate hardware type to use, and the cluster can select the substantially best set of compute resources to process that application. For example, if the submitted application is a heavy deep learning application that reads a large number of small images, the disclosed resource allocation techniques could indicate the newest GPU with a good CPU and the fastest disk type. Conversely, if the submitted application is a straightforward log parsing routine, the disclosed resource allocation techniques can select an old CPU with no GPU, and the slower disk type.

Among other benefits, the disclosed resource allocation techniques predict an allocation of resources, satisfying SLA requirements, for a given application, allowing the application to be efficiently executed on the needed types of compute resources.

One or more embodiments of the disclosure provide improved methods, apparatus and computer program products for allocation of shared computing resources using a classifier chain. The foregoing applications and associated embodiments should be considered as illustrative only, and numerous other embodiments can be configured using the techniques disclosed herein, in a wide variety of different applications.

It should also be understood that the disclosed resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for allocation of shared computing resources using a classifier chain may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
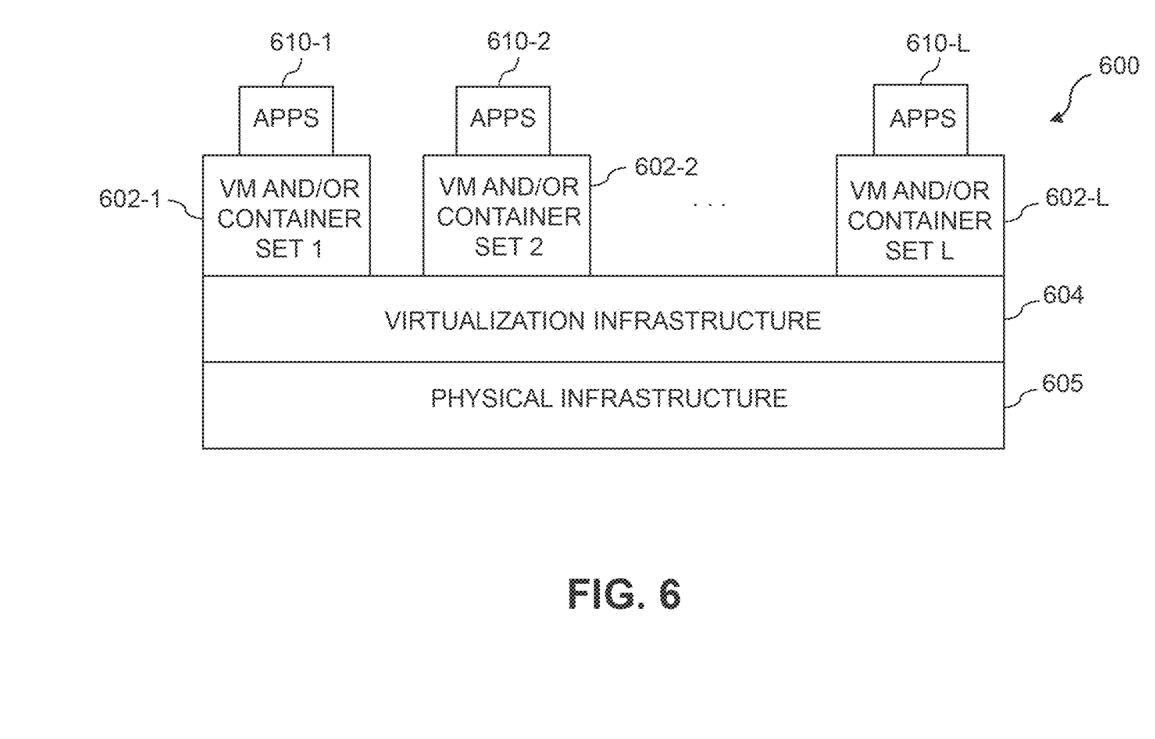
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the resource allocation system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide resource allocation functionality of the type described above for one or more processes running on a given one of the VMs. For example, each of the VMs can implement resource allocation control logic for providing resource allocation functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide resource allocation functionality of the type described above for one or more processes running on different ones of the containers. For example, a container host device supporting multiple containers of one or more container sets can implement one or more instances of resource allocation control logic for use in generating a resource allocation for a given application.

As is apparent from the above, one or more of the processing modules or other components of the disclosed resource allocation system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
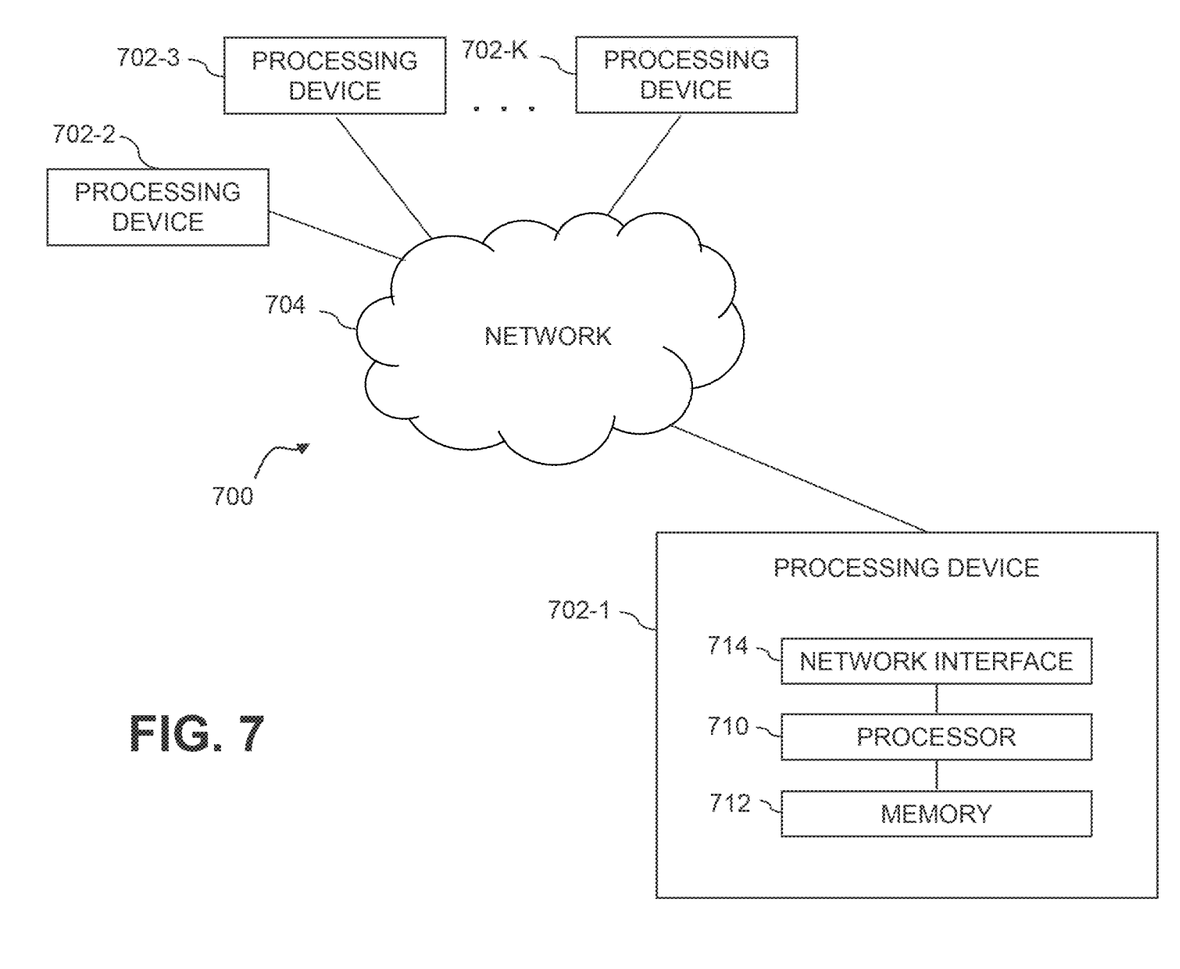
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining an application to be executed in a shared computing environment having a plurality of resources with a plurality of combinations of one or more hardware types;
   obtaining, using at least one processing device, a plurality of discriminative features for the application to be executed;
   obtaining, using the at least one processing device, at least one trained machine learning classifier chain, wherein the at least one trained machine learning classifier chain is trained using historical data and comprises a plurality of classifiers, wherein the plurality of classifiers comprises a classifier for each of a plurality of hardware types, wherein the at least one trained machine learning classifier chain is trained using a set of discriminative features obtained for a plurality of executed applications and a corresponding combination of hardware types allocated to each executed application and wherein each of the classifiers in the plurality of classifiers in the chain is trained using the set of discriminative features obtained for the plurality of executed applications and the combination of hardware types assigned by each of zero or more prior classifiers in the plurality of classifiers in the chain; and
   generating, using the at least one processing device and the at least one trained machine learning classifier chain, a prediction, using the discriminative features, of the combination of hardware types needed to satisfy one or more service level agreement requirements for the application to be executed in the shared computing environment.

2. The method of claim 1, wherein the at least one trained machine learning classifier chain is further trained using a corresponding measurement of one or more metrics of said service level agreement requirements obtained for each executed application.

3. The method of claim 2, wherein the set of discriminative features obtained for each of the plurality of executed applications is extracted from source code for each executed application.

4. The method of claim 2, wherein the corresponding combination of hardware types allocated to each executed application indicates the particular one or more hardware types allocated to each executed application.

5. The method of claim 1, wherein the at least one trained machine learning classifier chain models correlations among the combinations of the one or more hardware types.

6. The method of claim 1, wherein the generating step determines a classification for each of the classifiers in the plurality of classifiers in the classifier chain using the set of discriminative features obtained for the application and the combination of hardware types assigned by each of zero or more prior classifiers in the plurality of classifiers in the chain.

7. A computer program product, comprising a non-transitory machine-readable storage medium having encoded therein executable code of one or more software programs, wherein the one or more software programs when executed by at least one processing device perform the following steps:
obtaining an application to be executed in a shared computing environment having a plurality of resources with a plurality of combinations of one or more hardware types;
obtaining a plurality of discriminative features for the application to be executed;
obtaining at least one trained machine learning classifier chain, wherein the at least one trained machine learning classifier chain is trained using historical data and comprises a plurality of classifiers, wherein the plurality of classifiers comprises a classifier for each of a plurality of hardware types, wherein the at least one trained machine learning classifier chain is trained using a set of discriminative features obtained for a plurality of executed applications and a corresponding combination of hardware types allocated to each executed application and wherein each of the classifiers in the plurality of classifiers in the chain is trained using the set of discriminative features obtained for the plurality of executed applications and the combination of hardware types assigned by each of zero or more prior classifiers in the plurality of classifiers in the chain; and
generating, using the at least one processing device and the at least one trained machine learning classifier chain, a prediction, using the discriminative features, of the combination of hardware types needed to satisfy one or more service level agreement requirements for the application to be executed in the shared computing environment.

8. The computer program product of claim 7, wherein the at least one trained machine learning classifier chain is further trained using a corresponding measurement of one or more metrics of said service level agreement requirements obtained for each executed application.

9. The computer program product of claim 8, wherein the set of discriminative features obtained for each of the plurality of executed applications is extracted from source code for each executed application.

10. The computer program product of claim 8, wherein the corresponding combination of hardware types allocated to each executed application indicates the particular one or more hardware types allocated to each executed application.

11. The computer program product of claim 7, wherein the generating step determines a classification for each of the classifiers in the plurality of classifiers in the classifier chain using the set of discriminative features obtained for the application and the combination of hardware types assigned by each of zero or more prior classifiers in the plurality of classifiers in the chain.

12. An apparatus, comprising:
a memory; and
at least one processing device, coupled to the memory, operative to implement the following steps:
obtaining an application to be executed in a shared computing environment having a plurality of resources with a plurality of combinations of one or more hardware types;
obtaining a plurality of discriminative features for the application to be executed;
obtaining at least one trained machine learning classifier chain, wherein the at least one trained machine learning classifier chain is trained using historical data and comprises a plurality of classifiers, wherein the plurality of classifiers comprises a classifier for each of a plurality of hardware types, wherein the at least one trained machine learning classifier chain is trained using a set of discriminative features obtained for a plurality of executed applications and a corresponding combination of hardware types allocated to each executed application and wherein each of the classifiers in the plurality of classifiers in the chain is trained using the set of discriminative features obtained for the plurality of executed applications and the combination of hardware types assigned by each of zero or more prior classifiers in the plurality of classifiers in the chain; and
generating, using the at least one processing device and the at least one trained machine learning classifier chain, a prediction, using the discriminative features, of the combination of hardware types needed to satisfy one or more service level agreement requirements for the application to be executed in the shared computing environment.

13. The apparatus of claim 12, wherein the at least one trained machine learning classifier chain is further trained using a corresponding measurement of one or more metrics of said service level agreement requirements obtained for each executed application.

14. The apparatus of claim 13, wherein the set of discriminative features obtained for each of the plurality of executed applications is extracted from source code for each executed application.

15. The apparatus of claim 13, wherein the corresponding combination of hardware types allocated to each executed application indicates the particular one or more hardware types allocated to each executed application.

16. The apparatus of claim 12, wherein the at least one trained machine learning classifier chain models correlations among the combinations of the one or more hardware types.

17. The apparatus of claim 12, wherein the generating step determines a classification for each of the classifiers in the plurality of classifiers in the classifier chain using the set of discriminative features obtained for the application and the combination of hardware types assigned by each of zero or more prior classifiers in the plurality of classifiers in the chain.

18. The method of claim 1, wherein the set of discriminative features obtained for the plurality of executed applications comprises characteristics of each executed application and wherein the corresponding combination of hardware types allocated to each executed application comprises an amount of compute resources allocated to each executed application.

19. The computer program product of claim 8, wherein the set of discriminative features obtained for the plurality of executed applications comprises characteristics of each executed application and wherein the corresponding combination of hardware types allocated to each executed application comprises an amount of compute resources allocated to each executed application.

20. The apparatus of claim 12, wherein the set of discriminative features obtained for the plurality of executed applications comprises characteristics of each executed application and wherein the corresponding combination of hardware types allocated to each executed application comprises an amount of compute resources allocated to each executed application.

\* \* \* \* \*